United States Patent Office 3,313,107
Patented Apr. 11, 1967

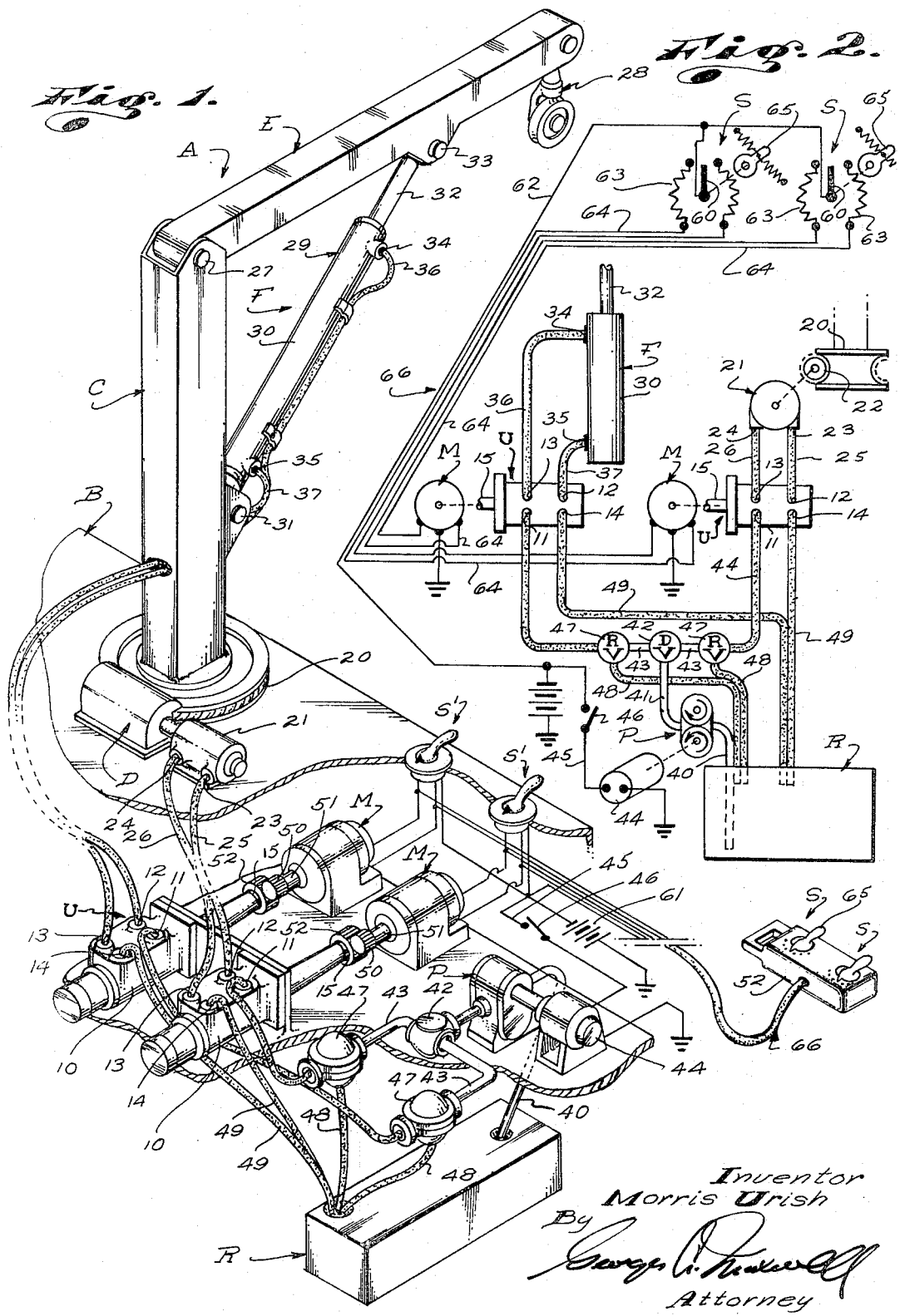

3,313,107
CONTROL MEANS
Morris Urish, Buena Park, Calif., assignor to Fornaciari Company, Los Angeles, Calif., a partnership of California
Filed May 23, 1966, Ser. No. 552,134
10 Claims. (Cl. 60—52)

This invention relates to an electro-hydraulic control means, and is more particularly concerned with a means for controlling the operation of hydraulic cylinder and ram units and hydraulic motors from remote stations.

Throughout industry, there is a great number of situations where parts are moved and work is performed by hydraulic cylinder and ram units and by hydraulic motors. The cylinder and ram units, hereinafter referred to as rams, and the hydraulic motors, hereinafter referred to as motors, are supplied with fluid, under pressure, through suitable supply lines or hoses, and their operation is controlled by suitable solenoid, hydraulic, pneumatic, mechanical or manually operated valves arranged in the supply lines. The control valves are, in effect, on and off type valves and afford little or no control over the rate of fluid supplied to the rams and motors, in the absence of time consuming and careful manual operation of the valves or the provision of costly and exotic mechanical valve operating mechanisms for varying the opening of the valves to gain a desired metering effect of the fluid being handled. Even in such a situation the desired metering effect may be impossible to attain.

While a great number of metering valves provided by the prior art are suitable for controlling the rate of flow of fluid to and from rams and motors, the overwhelming majority of such valves are extremely costly, must be manually operated with great care and precision, and do not control the direction of flow. If such un-directional metering valves are operated by electric, fluid or mechanical operating means and mechanisms, such means and mechanisms are complicated, delicate and extremely costly.

As a result of the un-directional flow of available metering valves, the ordinary apparatus employing a plurality of hydraulic rams and motors must be provided with simple, dependable, inexpensive on and off type valves to control the direction of flow of fluid to and from the rams and motors.

As a result of the above, in the ordinary hydraulically operated apparatus, there is little or no control over the rate at which the motors and rams operate and they are generally rather jerky and abrupt in operation, the rate of the output of work is not in proportion to an input movement to the valve.

Typical of apparatus where only on and off type valves can be afforded and where operation of the apparatus is undesirably jerky and abrupt are those apparati involving rotatable, pivotal and extensible booms supported on and carried by the beds of trucks. Such hydraulically operated booms, on trucks, are used in aerial basket apparatus or so-called "cherry pickers" employed by utility companies for servicing overhead lines and the like and in "side-loaders" employed by construction companies to raise and lower heavy objects of work, such as water mains occurring adjacent the sides of the trucks. In the ordinary "cherry-picker" or "side-loader," the on and off valves for controlling the flow of fluid to and from the rams and motors are generally located in close proximity to the arms and motors and controlled from a remote, fixed station on the truck by means of mechanical mechanism involving shafts and gears, links and levers and cables and sheaves. Such mechanical mechanisms are replete with undesirable features and are costly to set up and maintain, and may not be in a position for the operator to closely observe the work he is performing.

An object of my invention is to provide a novel control means for the motors and rams of a hydraulically operated apparatus.

It is an object of the present invention to provide a control means of the general character referred to wherein fluid to the rams and motors is easily and conveniently metered to provide infinite speed and directional control over the feed and operation of the rams and motors.

Yet another object of my invention is to provide a control means of the character referred to having easy and convenient to carry and move manual controls, whereby an operator can move to any convenient location about the job site and about the apparatus to control the operation of the apparatus.

A feature of my invention is to provide control means of the character referred to wherein the flow of fluid to and from each ram and motor is under control of a unitary metering and valving unit with a rotatable control shaft and which meters a specific amount of fluid upon each rotation of the shaft and which directs said metered flow through one of two delivery ports and through related fluid conducting lines upon rotation of the control shaft in one or the other direction.

Another feature of the present invention is to provide a means to the character referred to which includes a direct current, reversible electric drive motor for each metering and valving unit and adapted to drive the control shaft thereof in one or the other direction and a manually operable two-way variable resistance control switch for the drive motor, which switch is connected with the drive motor and a power source by an elongated, flexible cable.

In practice, other controls, such as rectifiers can be employed without departing from the spirit of this invention, which rectifiers would be considered equivalents to the switch illustrated.

Accordingly, it is an object of the present invention to provide control means of the character referred to wherein the direction and the rate of flow of fluid to and from a related hydraulically operated ram or motor is under control of a manually operable two-way variable resistance switch at the free end of an elongate flexible cable.

The foregoing and other objects and features of my invention will be fully understood from the following detailed description of a typical carrying out of my invention, throughout which description reference is made to the accompanying drawings, in which:

FIG. 1 is a diagrammatic isometric view of a typical hydraulically operated apparatus with my new control means related thereto; and, FIG. 2 is an electric and hydraulic diagrams of the apparatus and system shown in FIG. 1 of the drawings.

The operating or control means that I provide employs as its heart or principal components a remote servo-hydraulic control unit U for each cylinder or ram unit to be controlled, which unit U is of a special and unique character. The unit U employed is that unit disclosed and claimed in Patent Numbers Re. 25,291 and Re. 25,126, issued Feb. 20, 1962, to Lynn L. Charlson, entitled, "Controller for Fluid Pressure Operated Devices," and which is manufactured by Char-Lynn Company in Minneapolis, Minn., and which is sold under the trade name "Orbitrol."

The above-identified control unit is primarily intended for use as a power-steering control for motor vehicles and is referred to and defined by manufacturers as a "remote rotary servo hydraulic control." The rotary servo hydraulic control unit U is a unitary structure which feeds fluid as directed by a manually controlled valve means, measures the fluid required by a fluid metering means, and uses the fluid measuring or metering means to reposition the base or normal position of the hydraulic mechanism, with which it is related.

Each unit U includes a body 10 containing the valving and metering means. The body 10 has four ports to connect with fluid lines, there being an inlet port 11 to connect with a fluid supply, a pair of flow ports 12 and 13 to connect with the hydraulic mechanisms to be controlled and an exhaust port 14 to connect with a fluid reservoir, or the like. In addition to the above, each unit has an elongate control shaft 15, which shaft drives the valving and metering means.

In operation, each unit U is such that a volume of fluid, under pressure and introduced into the body through the inlet port 11, is flowed out through one of the flow ports 12 and/or 13 and is flowed in through the other of said flow ports upon each revolution of the shaft, the direction of flow into and out of said flow ports 12 and 13 being directed by the direction of rotation of the shaft, the rate of flow being determined by the speed of the shaft.

Since the details of construction and further or additional and specific details of operation of the units U do not form a part of my invention, further detailed consideration and description thereof will be dispensed with.

The hydraulically operated apparatus A with which my new control means is related is shown as a "side-loader," that is, a small compact crane-like structure mounted on the side of the truck bed B or other suitable platform.

The apparatus A includes an elongate vertical column C, which column projects upwardly from the bed B and is suitably rotatably mounted to or on the bed for rotation about its vertical longitudinal axis.

A drive means D is provided to rotate the column about its axis, which means is shown as including a ring gear 20, fixed to and arranged about the lower end of the column, adjacent the bed, a reversible hydraulic motor 21 mounted on the bed, and a drive gear 22 engageable with the ring gear and driven by the motor 21. The reversible motor 21 is provided with a pair of flow ports 23 and 24, which connect with flow lines 25 and 26 extending to and connect with the flow ports 12 and 13 of the unit U related to the motor.

The apparatus further includes an elongate boom E, having an inner end pivotally mounted to the upper end of the column, as at 27, an outer free end which carries a suitable work-supporting means, such as a sheave 28, and hydraulic actuating means F for pivoting the boom relative to the column and including a ram unit 29, having an elongate cylinder 30 with one end pivotally connected with the column C intermediate the ends thereof, as at 31, and a ram 32 with one end portion extending into the other end of the cylinder and having its other end pivotally connected with the boom E, intermediate the ends thereof, as at 33.

The ram unit F is a double-acting unit and the cylinder 30 thereof is provided with a pair of axially spaced flow ports 34 and 35, which ports connect with flow lines 36 and 37, extending to and connected with the flow ports 12 and 13 of the unit U related to the cylinder and ram of the means F.

With the structure thus far described, it will be apparent that the column C can be rotated to swing the boom horizontally in either direction, by operation of the motor 21 of the means D and that the outer end of the boom can be raised and lowered as desired by operation of the ram unit of the actuating means F.

The fluid system of my control means further includes a fluid reservoir R, a pump P connected with the reservoir by means of a suction line 40, a discharge line 41 extending from the pump.

It is to be understood that a separate pump could be provided for any one or any desired group of units, as desired or as circumstances require.

The fluid system further includes a divider valve 42 connected with and receiving fluid from the line 41 and delivery lines 43 connected with and extending between the divider valve 42 and the inlet port 11 of the unit U.

The pump P is driven by a suitable prime mover, which in the preferred carrying out of the invention and as illustrated, is an electric motor 44, which motor receives power from a battery or other suitable power source through a line 45, in which a suitable on and off switch 46 is engaged.

In the invention, it is contemplated that under special circumstances other forms of prime movers might be employed which would be mechanical equivalents of the motor 44.

In the preferred carrying out of the invention, suitable pressure relief valves 47 are provided in the delivery line 43. The valves 47 are provided with by-pass lines 48 extending to the reservoir R.

Finally, the fluid system includes return lines 49 connected with and extending between the exhaust ports 14 of the units U and the reservoir R.

The control means that I provide further includes a reversible, direct current, drive motor M for each unit U. Each motor M has a drive gear 50 on its output shaft 51, which gear engages a driven gear 52 on the control shaft 15 of its related unit U.

Each drive motor M is under control of a manually operable two-way, spring center, variable resistance switch S. The switches S are mounted in and carried by a portable console or box 52.

Each switch S has a primary brush-type contact 60 connected with any suitable source of direct current, such as suitably rectified alternating current, or, as illustrated, a battery 61 by means of a power line 62; a pair of spaced secondary contacts with variable resistance legs 63, selectively engageable by the contact 60 and conductors 64 connected with the secondary contacts and each extending to and connected with a winding of the motor M with which the switch is related.

In practice, the primary contact 60 of each switch is provided with a manually engageable, pivotal, operating handle or knob 65 and is spring-loaded to normally occur in an open or mean position between the resistance legs of the switch and such that when turned to close contact with one of said legs and then released, the contact 60 will return to said mean or open position.

The several conductors and power line or lines are of considerable longitudinal extent, are flexible and are arranged in adjacent relationship to each other to establish an elongate flexible control cable 66, which cable can be suitably jacketed and armored.

With the above relationship of parts, it will be apparent that the console or box 52, which carries the switches S, can be moved and transported about the apparatus as desired or as circumstances require.

In practice, if desired and as illustrated in the drawings, a set of secondary control switches S′, suitably connected with the lines forming the cable 66, can be provided at a fixed station on the bed B of the truck or at some other desired and suitable location.

In operation, when it is desired to swing the boom E horizontally in a clockwise direction, the switch S related to the means D is manually turned in one direction, for example, in a clockwise direction. Turning the switch, as indicated, energizes the motor M related to said switch and the means D to drive the shaft 15 of the related unit U in that direction, whereby fluid is metered and flowed out through one of the flow ports, for example, through the flow port 11 and into the motor 21 through the port 23 energizing the motor 21 and resulting in clockwise turning of the column C and boom E.

Upon initial closing of the switch S, the resistance leg 63 limits the flow of current to the motor M and the resulting speed of operation of the entire system is slow. If it is desired to speed the operation of the system, the switch is turned further in a clockwise direction to reduce the resistance and to thereby increase the flow of current to the motor and the speed thereof in direct proportion to the movement of switch S.

When it is desired to swing the boom in a counter-clockwise direction, the appropriate switch S is turned counter-clockwise, whereby the motor M is energized to turn in the other direction, thereby reversing the direction of operation of the remainder of the structure.

It will be apparent that raising and lowering of the boom E is accomplished in the same manner as pivoting the column is accomplished, except that a different and appropriate switch S is engaged. That is, the switch S related to the means F is engaged and operated to effect raising and lowering the boom.

It will be apparent that the hydraulic system provided is a closed system and, as such, that is economical of fluid and is easy and economical to maintain.

While I have illustrated by new electrohydraulic control means related to the hydraulic motor and to a hydraulic ram unit in a "side-loader," it will be apparent that said means can be employed in any hydraulic system having similar motors and/or ram units and in which it is desired to infinitely and smoothly control the direction and speed of operation of said motors and ram units in the same or similar manner. Separate pumps P for each unit U can be used instead of a flow divider valve 42. There is no theoretical limit to the number of unit combinations in a hydraulic circuit.

Having described only a typical preferred form and application of my invention, I do not wish to be limited to the specific details herein set forth, but wish to reserve to myself any modifications and/or variations that may appear to those skilled in the art and which fall within the scope of the following claims:

Having described my invention, I claim:

1. In combination, a work performing apparatus including, a hydraulically operated power exerting means with a pair of spaced inlet and outlet flow ports, and control means to selectively direct fluid into and out of the inlet and outlet flow ports to change the direction of operation and to vary the rate of flow to vary the speed of operation of said power exerting means and including a fluid reservoir, a motor-driven fluid pump with a suction port and a discharge port, a suction line between the reservoir and said suction port, a remote rotary servo-hydraulic control unit having a pair of spaced flow ports, an inlet port and an exhaust port, a delivery line between the discharge and inlet ports, a pair of flow lines, each connected with one flow port and with one of said inlet and outlet ports, and an exhaust line between the exhaust port and the reservoir, said unit having a rotatable control shaft, the direction of rotation of which controls the direction of flow into and out of said flow ports and the speed of rotation of which controls the rate of said flow, a reversible drive motor driving said shaft, a manually operable control switch with variable resistances connected with a motor and a power source and operable to control the direction of rotation and the speed of rotation of said motor.

2. A structure as set forth in claim 1 including, a pressure relief valve in the delivery line and a return line between said relief valve and the reservoir.

3. A structure as set forth in claim 1 wherein said reversible motor is a direct current electric motor and said manual switch has a pair of spaced variable resistance contact legs connected with the power source and selectively engageable with the contact legs and a manually engageable operating knob connected with said rotary contact.

4. A structure as set forth in claim 1 wherein said reversible motor is a direct current electric motor and said manual switch has a pair of spaced variable resistance contact legs connected with the motor winding, a rotary contact connected with the power source and selectively engageable with the contact legs and a manually engageable operating knob connected with said rotary contact, said delivery line having a pressure relief valve arranged therein, said relief valve having a return line extending to the reservoir.

5. A structure as set forth in claim 1 wherein said control switch is carried by a portable box and is connected with the motor and the power source by lines of an elongate flexible electric cable.

6. A structure as set forth in claim 1 wherein said reversible motor is a direct current electric motor and said manual switch has a pair of spaced variable resistance contact legs connected with the motor winding, a rotary contact connected with the power source and selectively engageable with the contact legs and a manually engageable operating knob connected with said rotary contact, said switch being carried by a portable box and said contact being connected with the motor and power source by lines of an elongate flexible electric cable.

7. A structure as set forth in claim 1 wherein said reversible motor is a direct current electric motor and said manually operated switch has a pair of spaced variable resistance contact legs connected with the motor winding, a rotary contact connected with the power source and selectively engageable with the contact legs and a manually engageable operating knob connected with said rotary contact, said switch being carried by a portable box and said contact being connected with the motor and power source by lines of an elongate flexible electric cable, said delivery line having a pressure relief valve arranged therein, said valve having a return line extending to the reservoir.

8. In combination, a work-performing apparatus including a plurality of hydraulically operated power exerting means, each with a pair of spaced inlet and outlet flow ports, control means to selectively direct fluid into and out of the flow ports to change the direction of operation and to vary the rate of flow to vary the speed of operation of each of said power exerting means, and including, a fluid reservoir, a motor-driven fluid pump with a suction port and a discharge port, a suction line between the reservoir and the suction port, a divider valve, a discharge line between said divider valve and the discharge port, a remote rotary servo-hydraulic control unit for each power exerting means, each unit having a pair of spaced flow ports, an inlet port and an exhaust port, a delivery line between the inlet port and the divider valve, a pair of flow lines, each connected with one flow port and one of said inlet and outlet flow ports of its related power exerting means, and an exhaust line between the exhaust port and the reservoir, each unit having a rotatable control shaft, the direction of rotation of which controls the direction of flow into and out of said flow ports and the speed of rotation of which controls the rate of said flow, a reversible motor related to each unit and driving said shaft, a manually operable control switch for each motor connected with a power source and having variable resistances connected with the motor to control the direction of rotation and speed of the motor.

9. A structure as set forth in claim 8 including, a pressure relief valve in each delivery line, each valve having a return line extending to said reservoir.

10. A structure as set forth in claim 8 wherein said switches are carried by a portable box, each switch including, a pair of spaced variable resistance contact legs connected with the winding of its related motor, a rotary contact connected with the power source and normally spaced between the contact legs and selectively shiftable into contact with said legs, and a manually engageable operating knob connected with the rotary contact, said contacts of the several switches being connected with the power source and with the winding of their related motors by lines of an elongate flexible electric cable, said delivery lines having pressure relief valves arranged therein, said relief valves having return lines extending to the reservoir.

References Cited by the Examiner

UNITED STATES PATENTS

| | | | |
|---|---|---|---|
| 2,233,222 | 2/1941 | Paton | 91—459 X |
| 2,398,421 | 4/1946 | Frische et al. | |
| 2,643,515 | 6/1953 | Harsch | 91—414 X |
| 3,007,494 | 11/1961 | Herzl | 137—625.65 |

EDGAR W. GEOHEGAN, *Primary Examiner.*